United States Patent [19]
Ferrand

[11] Patent Number: 5,241,917
[45] Date of Patent: Sep. 7, 1993

[54] DEVICE FOR THE AUTOMATIC SETTING IN PLACE AND POSITIONING OF PLANTS

[76] Inventor: Claude Ferrand, 263 Route de Bellet, Nice, 06200, France

[21] Appl. No.: 768,745

[22] PCT Filed: Apr. 24, 1990

[86] PCT No.: PCT/FR90/00290
§ 371 Date: Oct. 21, 1991
§ 102(e) Date: Oct. 21, 1991

[87] PCT Pub. No.: WO90/12491
PCT Pub. Date: Nov. 1, 1990

[30] Foreign Application Priority Data

Apr. 24, 1989 [FR] France ............................ 89 05570
Apr. 18, 1990 [FR] France ............................ 90 05172

[51] Int. Cl.⁵ .......................... A01C 11/02; A01G 9/08
[52] U.S. Cl. ..................................... 111/114; 111/103; 111/104; 111/115; 111/174; 111/96; 111/200
[58] Field of Search .............. 111/100, 103, 104, 114, 111/115, 174, 170, 95, 96, 200

[56] References Cited
U.S. PATENT DOCUMENTS

| | | | |
|---|---|---|---|
| 2,835,419 | 5/1958 | Kolk | 222/442 |
| 3,712,252 | 1/1973 | Huang | 111/115 X |
| 3,998,171 | 12/1976 | Lofgren et al. | 111/117 |
| 4,069,774 | 1/1978 | Lofgren et al. | |
| 4,388,035 | 6/1983 | Cayton et al. | 414/417 |
| 4,899,672 | 2/1990 | Paul | 111/174 |

FOREIGN PATENT DOCUMENTS

| | | |
|---|---|---|
| 1195118 | 10/1985 | Canada. |
| 067141 | 12/1982 | European Pat. Off.. |
| 843037 | 7/1949 | Fed. Rep. of Germany. |
| 2455759 | 6/1975 | Fed. Rep. of Germany. |
| 2560482 | 9/1985 | France. |
| 97394 | 1/1961 | Norway ............................. 111/174 |
| 1136771 | 12/1968 | United Kingdom ................ 111/174 |

*Primary Examiner*—Randolph A. Reese
*Assistant Examiner*—Christopher J. Novosad
*Attorney, Agent, or Firm*—Sandler Greenblum & Bernstein

[57] ABSTRACT

Device for automatic positioning of plants is provided with a vertical positioner element conical at the top and cylindrical at the bottom wherein is introduced by known means the plant with its earth ball. The earth ball is located in the cylindrical portion while the plant itself is in the conical portion which is upwardly tapered. An insufflation head is provided with a seal adjusted to the positioner element and permitting the injection of air or a gas when the assembly, including the positioner element and the insufflation head, is above a hole which has been previously made in a receiver element where the planting is to take place. The device facilitates and automates the setting in place of plants of all kinds while preserving their integrity owing to the use of non-mechanical handling means.

13 Claims, 2 Drawing Sheets

DEVICE FOR THE AUTOMATIC SETTING IN PLACE AND POSITIONING OF PLANTS

BACKGROUND OF THE INVENTION

1. Field of the Invention

The present invention is directed to a device for the automatic setting in place and positioning of plants.

It is adapted to facilitate and automate the positioning of all types of plants, while preserving their integrity by virtue of the use of non-mechanical handling means.

2. Discussion of Background Material

The devices manufactured up until now have had to use manual positioning, requiring substantial labor or to use mechanized systems using robots equipped with pliers, needles or pusher devices, whose action on the plants, especially young plants, consequently delicate plants, risks damaging them at the level of the roots and the leaves.

U.S. Pat. No. 4,388,035 describes a machine especially characterized by the successive use of three insufflations of air in order to position the plant in the earth. This machine is obviously complicated, and due to the way that it is conceived, promotes the risk of causing lesions to plants, thereby necessitating the insertion of the latter plant in a "bit" of earth before the transplantation operations. This substantially increases the costs of the operation.

The device according to the present invention eliminates all of these disadvantages. Indeed, it enables complete automation of transplantation operations while completely eliminating risks of lesion of the roots and leaves.

SUMMARY OF THE INVENTION

It is constituted of the combination of the present invention to provide a vertical positioner element, conical on top and cylindrical at the bottom, in which the plant, with its earth ball, is introduced by known means. The earth ball is placed in the cylindrical part, whereas the plant itself is located in the conical part, tapered upwardly. The combination includes an insufflation head equipped with a seal adjusted on the positioner element, and enabling injection of air or of a gas at the moment when the assembly is located above a hole previously made in the receiver element in which the young plant must be placed.

BRIEF DESCRIPTION OF THE DRAWINGS

In the annexed drawings, given as non-limitative examples embodiments of the present invention.

DETAILED DESCRIPTION OF THE PREFERRED EMBODIMENTS

Figure 1:
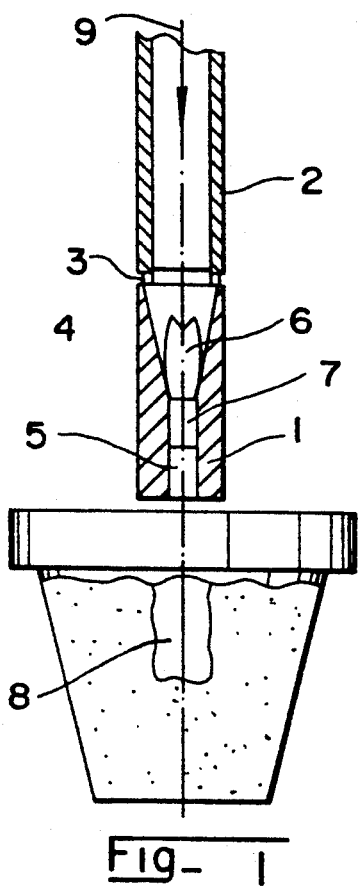
FIG. 1 is a diagrammatic vertical section of the device.
Figure 2:
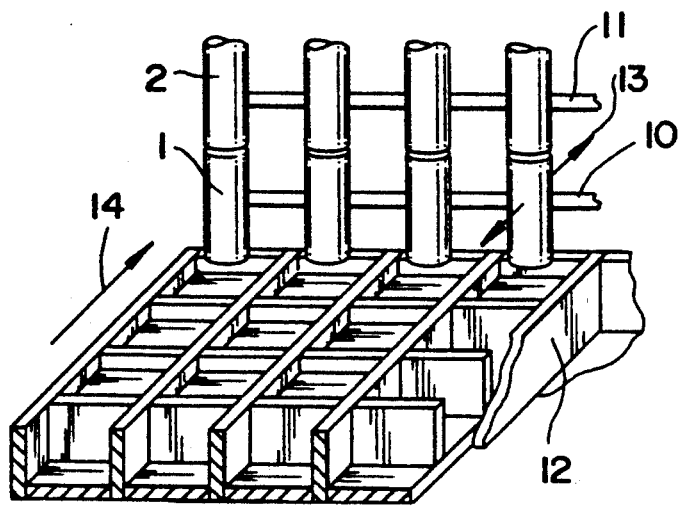
FIG. 2 illustrates at a different scale, an embodiment in which several assembled elements form a ramp.
Figure 3:
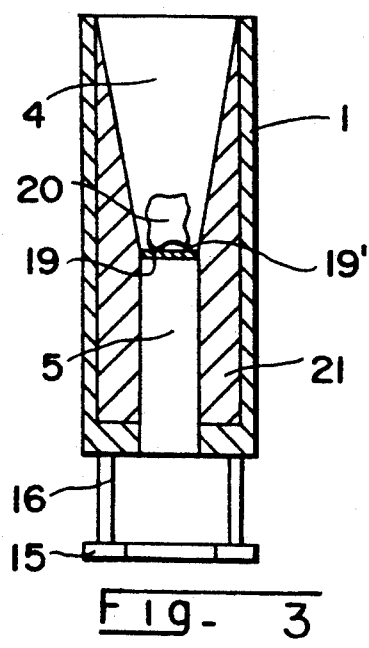
FIGS. 3 and 4 represent a vertical section of varying embodiments of the positioner element.
Figure 4:
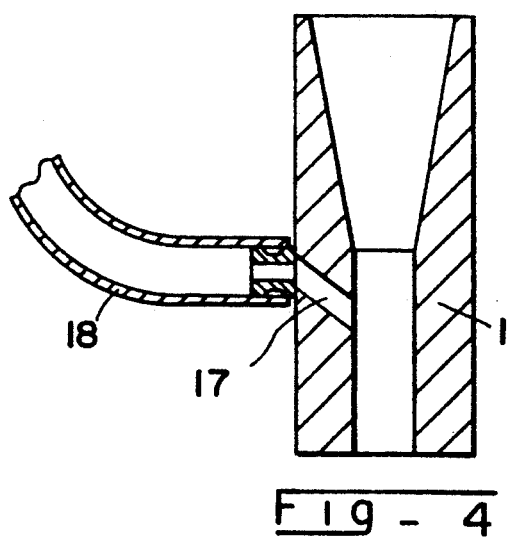
Figure 5:
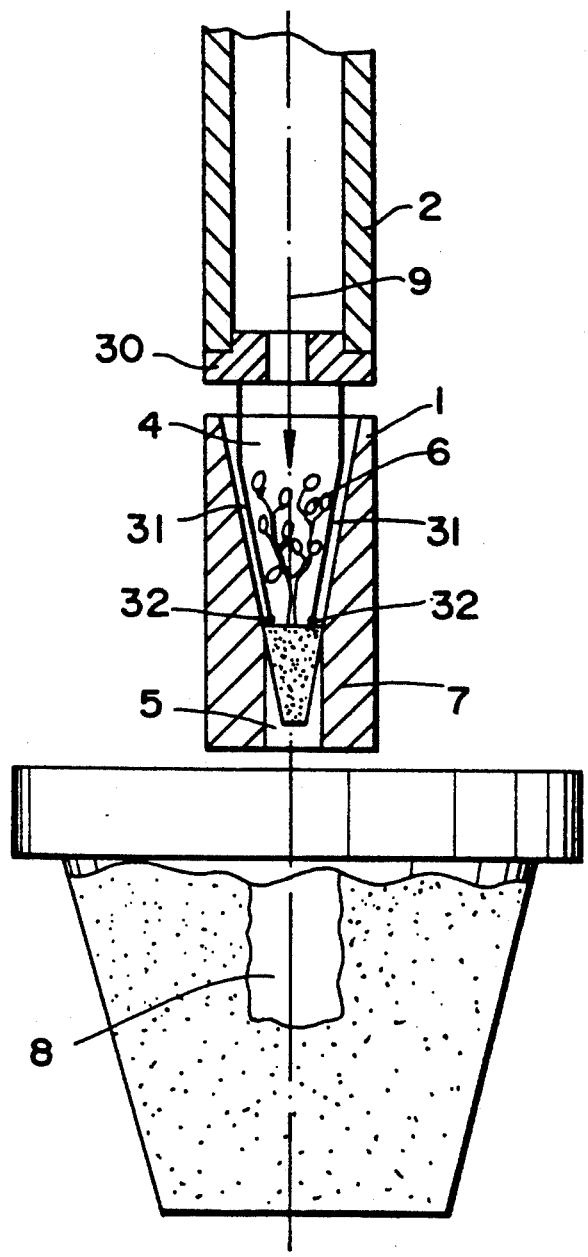
FIG. 5 is a diagrammatic vertical section illustrating another embodiment of the device with a centering pushing device.

The device as illustrated in FIGS. 1-4 is constituted by a positioner element 1 on which an insufflation element 2 may be adjusted by means of a seal 3, once the plant 6, 7 is inserted in the positioner element, e.g., positioner element 1 and the insufflation element 2 may be independently adjustable with respect to each other. The positioner element 1 comprises an internal vertical passage, preferably of a circular section, but also being able to have a polygonal or other shape. The top of the passage 4, adapted to receive the upper part 6 of the young plant, is conical and tapered towards the top, whereas the lower part 5 of the passage receives the micro earth ball 7, attached to the plant. The internal part 21 (FIG. 3) of the positioner element 1 may be interchangeable, so as to adapt itself to the dimensions of the plant.

The insufflation head 2 is linked to a source of compressed air or gas, controlled by a system (not described) activating a propulsion along arrow 9 at the moment when the positioner element 1 is above a hole 8 made previous to the positioning, where the planting will take place, so as to project the plant in the hole 8, without any mechanical action.

It is possible to mount several positioner elements 1 and several insufflation heads 2 on the bodies 10, 11, movable with respect to one another, so as to constitute ramps enabling the planting of several plants simultaneously, for example in casings 12 (FIG. 2) adapted for transport. The propulsions of air or of gas are synchronized with the relative movements indicated by arrows 13 and 14 of the positioner elements and the receiving assemblies 12.

According to another embodiment (FIG. 3), the positioner element 1 may be equipped with a spreader, constituted of a hoop 15 fixed to element 1 by spacers 16, whose aim is to impose a space between the device and the earth and to stop the earth from being blown by the compressed air or gas. According to still another embodiment (FIG. 4) the positioner element 1 may be equipped with a lateral injector 17 fed by a flexible tube 18, enabling cleaning or watering water to be injected, or other products such as fertilizers.

According to still yet another embodiment, the positioner element 1 may be provided with a flexible membrane 19 comprising a slot 191 shaped like a cross, for example, on which one or several seeds 20 are positioned so as to be projected in the earth by the propulsions of air or of gas.

In a last embodiment, the lower portion 30 of the insufflation head 2 is equipped with a mechanical pusher device 31 ending in bulges 32 adapted to avoid damaging the plant 6 or earth ball 7. The pusher device is determined so as to be able to penetrate, from the top, into the positioner element 1 after positioning of plant 6, and to press on earth ball 7 so as to push the assembly outside. This action may be completed or not by a propulsion of compressed air or of gas projected in a synchronized fashion by the insufflation head.

The pusher device 31 is rigid or flexible. It may be constituted of two or more rods or blades, and may also be tubular, or of any other shape, enabling it to fulfill its function.

By virtue of the labor saving that it enables, and by eliminating the risks of lesion of the processed plants, the device that has been described above is particularly advantageous for transplantation installations, and especially in agricultural farms, both large and medium sized. The positioning of these diverse constitutive elements confers this device with a maximum number of useful effects, that had not been obtained up until now by similar devices.

I claim:

1. Device for automatic setting in place and positioning of plants by means of positioner tubes being able to receive pneumatic propulsions, adapted to facilitate and automate the positioning of plants of all types, while preserving their integrity and aimed at transplantation installations in big or medium sized agricultural farms, comprising:

at least one vertical positioner element comprising an internal passage, said internal passage having successively arranged a conical top portion outwardly tapered towards an upper free end of said internal passage and a hollow bottom portion, said internal passage adapted to receive a plant along with its earth ball, whereby the earth ball is positioned in said hollow bottom portion and a remainder of the plant in said conical top portion; and at least one insufflation head adjustably positionable on said at least one vertical positioner element, at a moment when said at least one vertical positioner element is located above a hole previously made in a receiver element in which the plant is to be positioned, a pusher element extending from a lower part of said at least one insufflation head and penetrating downwardly inside said at least one vertical positioner element during downward movement of said insufflation head, so as to push the plant outside said at least one vertical positioner element by pressing on the earth ball, said pusher element, comprising at least two flexible rods or blades ending in bulges constructed to avoid damaging the plant or earth ball of the plant, and a pneumatic propulsion synchronized with relative movements of said at least one vertical positioner element and at least one receiver element for completing the plant setting when the at least one positioner element and the at least one receiver element are properly positioned.

2. Device according to claim 1, wherein said at least one vertical positioner element includes a spreader comprising a hoop fixed to said at least one vertical positioner element by spacers.

3. Device according to claim 1, wherein said at least one vertical positioner element includes a lateral injector fed by a flexible tube enabling injection of a solution.

4. Device according to claim 3, wherein said solution is selected from the group consisting of cleaning water, watering water, and fertilizer.

5. Device according to claim 1, wherein said hollow bottom portion is circular.

6. Device according to claim 1, comprising a plurality of vertical positioner elements and insufflation heads constructed and arranged so as to be movable as a unit to enable planting of a plurality of plants.

7. Device for the automatic positioning and setting in place of plants by means of positioner tubes able to receive pneumatic propulsions, adapted to facilitate and automate seed planting in large and medium sized agricultural farms, comprising:

at least one positioner element comprising an internal vertical passage including a flexible membrane capable of receiving at least one seed, said flexible membrane including a slot;

at least one insufflation head including a seal;

means for independently positioning said at least one insufflation head with respect to said at least one positioner element to obtain independent positioning of said at least one insufflation head on said at least one positioner element enabling a propulsion of air or of gas to be propulsed into the at least one positioner element, said propulsion synchronized with relative movements of said at least one positioner element, said at least one insufflation head and at least one receiver element for receiving the at least one seed, so as to project the at least one seed into said at least one receiver element when said at least one positioner element and said at least one receiver element are properly positioned.

8. Device according to claim 7, wherein said at least one positioner element includes a spreader comprising a hoop fixed to said at least one positioner element by spacers.

9. Device according to claim 7, wherein said at least one positioner element includes a lateral injector fed by a flexible tube enabling injection of a solution.

10. Device according to claim 9, wherein said solution is selected from the group consisting of cleaning water, watering water, and fertilizer.

11. Device according to claim 7, wherein a bottom portion of said internal vertical passage is circular.

12. Device according to claim 7, comprising a plurality of positioner elements and insufflation heads constructed and arranged so as to be movable as a unit to enable planting of a plurality of seeds.

13. Device according to claim 7, wherein said slot is cross shaped.

* * * * *